United States Patent
Wybenga et al.

(10) Patent No.: US 7,471,676 B2
(45) Date of Patent: Dec. 30, 2008

(54) APPARATUS AND METHOD FOR DISTRIBUTING CONTROL PLANE FUNCTIONS IN A MULTIPROCESSOR ROUTER

(75) Inventors: Jack C. Wybenga, Plano, TX (US); Patrick W. Ireland, Sanger, TX (US); Patricia Kay Sturm, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 861 days.

(21) Appl. No.: 10/826,138

(22) Filed: Apr. 16, 2004

(65) Prior Publication Data

US 2005/0232258 A1    Oct. 20, 2005

(51) Int. Cl.
*H04L 12/28* (2006.01)
*H04L 12/56* (2006.01)
(52) U.S. Cl. .................... 370/389; 370/400; 370/419
(58) Field of Classification Search ........................ None
See application file for complete search history.

(56) References Cited

U.S. PATENT DOCUMENTS 6,393,026 B1 *  5/2002  Irwin ......................... 370/401
7,079,539 B2 *  7/2006  Calle et al. ................... 370/392
7,283,538 B2 * 10/2007  Pham et al. .................. 370/401
2003/0128668 A1 *  7/2003  Yavatkar et al. .............. 370/238
2003/0231625 A1 * 12/2003  Calvignac et al. ........... 370/389
2004/0052261 A1 *  3/2004  Hashimoto et al. ....... 370/395.1
2005/0094565 A1 *  5/2005  Brown et al. ............. 370/236.2

* cited by examiner

*Primary Examiner*—Wing F Chan
*Assistant Examiner*—Robert C Scheibel

(57) ABSTRACT

A router for interconnecting external devices. The router comprises a switch fabric and a plurality of routing nodes coupled to the switch fabric. Each routing node comprises packet processing circuitry for transmitting data packets to, and receiving data packets from, the external devices and for transmitting data packets to, and receiving data packets from, other routing nodes via the switch fabric and control data processing circuitry capable of performing control and management functions. The control data processing circuitry comprises a first network processor for performing control and management functions associated with the router and a second network processor for performing control and management functions associated with the router. The control and management functions are dynamically allocated between the first network processor and the second network processor.

12 Claims, 4 Drawing Sheets

US 7,471,676 B2

APPARATUS AND METHOD FOR DISTRIBUTING CONTROL PLANE FUNCTIONS IN A MULTIPROCESSOR ROUTER

TECHNICAL FIELD OF THE INVENTION

The present invention is generally directed to distributed architecture routers and, in particular, to an apparatus and method using cognitive identical code to distribute control and management plane functions (or operations) between control processors of a multiprocessor router.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of a new generation of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

When a data packet arrives in a conventional routing node, a forwarding engine in the routing node uses forwarding tables to determine the destination of the data packet. A conventional Internet Protocol (IP) router uses a dedicated forwarding table for each type of traffic, such as Internet Protocol version 4 (IPv4), Internet Protocol version 6 (IPv6) and MPLS.

Conventional routers use many packet processors to route data traffic through the router. However, conventional routers typically use a single control plane processor to perform control plane functions (or operations) and management plane functions (or operations). The single control plane processor handles all management functions and all routing protocols. Some prior art routers may use two control plane processors, a primary and a secondary, for redundancy purposes. But each of these processors performs the same functionality. The primary control processor performs all control and management functions, while the secondary control processor is idle and waits for a failure of the primary control processor. Thus, the redundant processors are not used to increase the aggregate processing power and do not allow optimization of resource utilization through resource allocation.

Thus, the speed of control plane processing in prior art routers is limited by the processing power of a single processor. This fails to take advantage of parallel processing opportunities. To achieve high route update rates, expensive data processors must be used.

Therefore, there is a need in the art for improved high-speed routers. In particular, there is a need for a high-speed router in which control and management plane functions are not bottlenecked by a single control plane processor.

SUMMARY OF THE INVENTION

The present invention supports distribution of control plane functions (or operations) between the inbound and outbound network processors of a routing node, allows flexible resource allocation, uses standard protocols and operating system software, and provides a software solution with no additional hardware support.

In an advantageous embodiment, the present invention uses standard Linux sockets and standard protocols, such as TCP and UDP, to allow cognizant, but identical, control and management plane code to run in both the inbound and outbound network processors. This allows the distribution of management and routing functions (or operations) between these two processors, thereby allowing more aggregate processing power to be applied to the control plane functions and to allow splitting the workload between these processors as necessary to meet the control plane throughput requirements.

To address the above-discussed deficiencies of the prior art, it is a primary object of the present invention to provide a router for interconnecting external devices coupled to the router. According to an advantageous embodiment of the present invention, the router comprises: 1) a switch fabric; and 2) a plurality of routing nodes coupled to the switch fabric, wherein each of the plurality of routing nodes comprises i) packet processing circuitry capable of exchanging data packets with external devices and exchanging data packets with other ones of the plurality of routing nodes via the switch fabric and ii) control processing circuitry capable of performing control and management functions. The control processing circuitry comprises: i) a first network processor capable of performing control and management functions associated with the router; and ii) a second network processor capable of performing the control and management functions associated with the router, wherein the control and management functions are dynamically allocated between the first network processor and the second network processor.

According to one embodiment of the present invention, the control and management functions are dynamically allocated between the first network processor and the second network processor according to a first level of activity of control and management functions in the first network processor relative to a second level of activity of control and management functions in the second network processor.

According to another embodiment of the present invention, the first network processor is controlled by first control software code and the second network processor is controlled by second control software code substantially identical to the first control software code.

According to still another embodiment of the present invention, the first network processor determines a first group of control and management functions allocated to the first network processor by examining a configuration register associated with the first network processor.

According to yet another embodiment of the present invention, the second network processor determines a second group of control and management functions allocated to the second network processor by examining a configuration register associated with the second network processor.

According to a further embodiment of the present invention, a first one of the control and management functions may be re-allocated from the first group of control and management functions to the second group of control and management functions by modifying the contents of the first configuration register and the second configuration register.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch or router.

Figure 1:
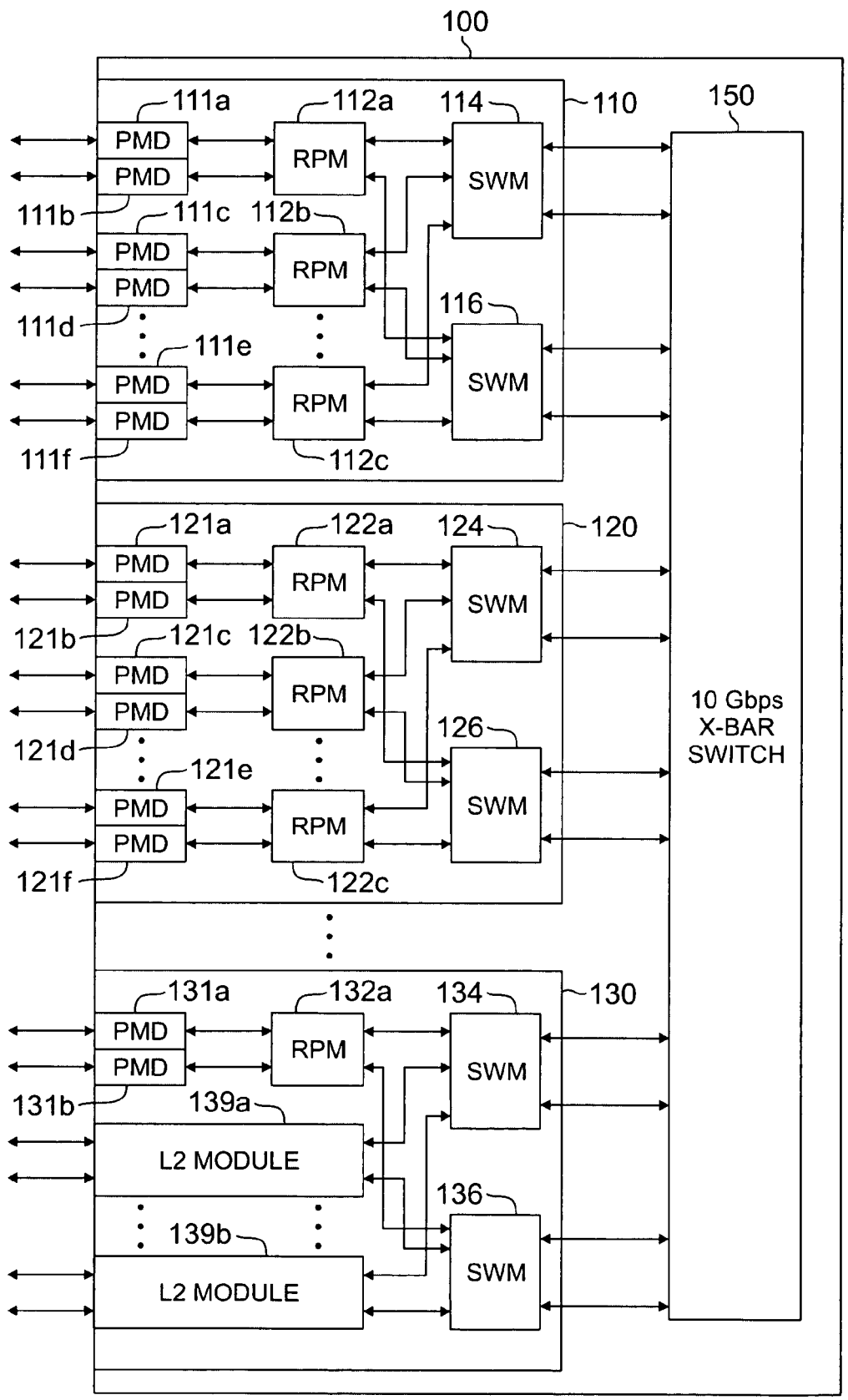
FIG. 1 illustrates an exemplary distributed architecture router, which distributes forwarding table lookup operations across a plurality of microengines and threads according to the principles of the present invention.

FIG. 1 illustrates exemplary distributed architecture router 100, which distributes control and management plane functions across a plurality of processors according to the principles of the present invention. Router 100 supports Layer 2 switching and Layer 3 switching and routing. Thus, router 100 functions as both a switch and a router. However, for simplicity, router 100 is referred to herein simply as a router. The switch operations are implied.

According to the exemplary embodiment, router 100 comprises N rack-mounted shelves, including exemplary shelves 110, 120, and 130, that are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMs) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 may comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112*a*, RPM 112*b*, and RPM 112*c*, and a plurality of physical media device (PMD) modules 111, including exemplary PMD modules 111*a*, 111*b*, 111*c*, 111*d*, 111*e*, and 111*f*. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122*a*, RPM 122*b*, and RPM 122*c*, and a plurality of physical media device (PMD) modules 121, including PMD modules 121*a*-121*f*. Each PMD module 121 transmits and receives data packets via a plurality of data lines connected to each PMD module 121.

Additionally, shelf 130 comprises redundant switch modules, namely primary SWM 134 and secondary SWM 136, route processing module 132*a*, a plurality of physical media device (PMD) modules 131, including PMD modules 131*a* and 131*b*, and a plurality of Layer 2 (L2) modules 139, including L2 module 139*a* and L2 module 139*b*. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 150 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 150, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route processing module (i.e., RPM 112b). The data packet must be forwarded to RPM 112b, but does not need to be forwarded to crossbar switch 150 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route-processing module (i.e., RPM 112a). The data packet still must be forwarded to RPM 112a, but does not need to be forwarded to crossbar switch 150 or to switch modules 114 and 116.

Figure 2:
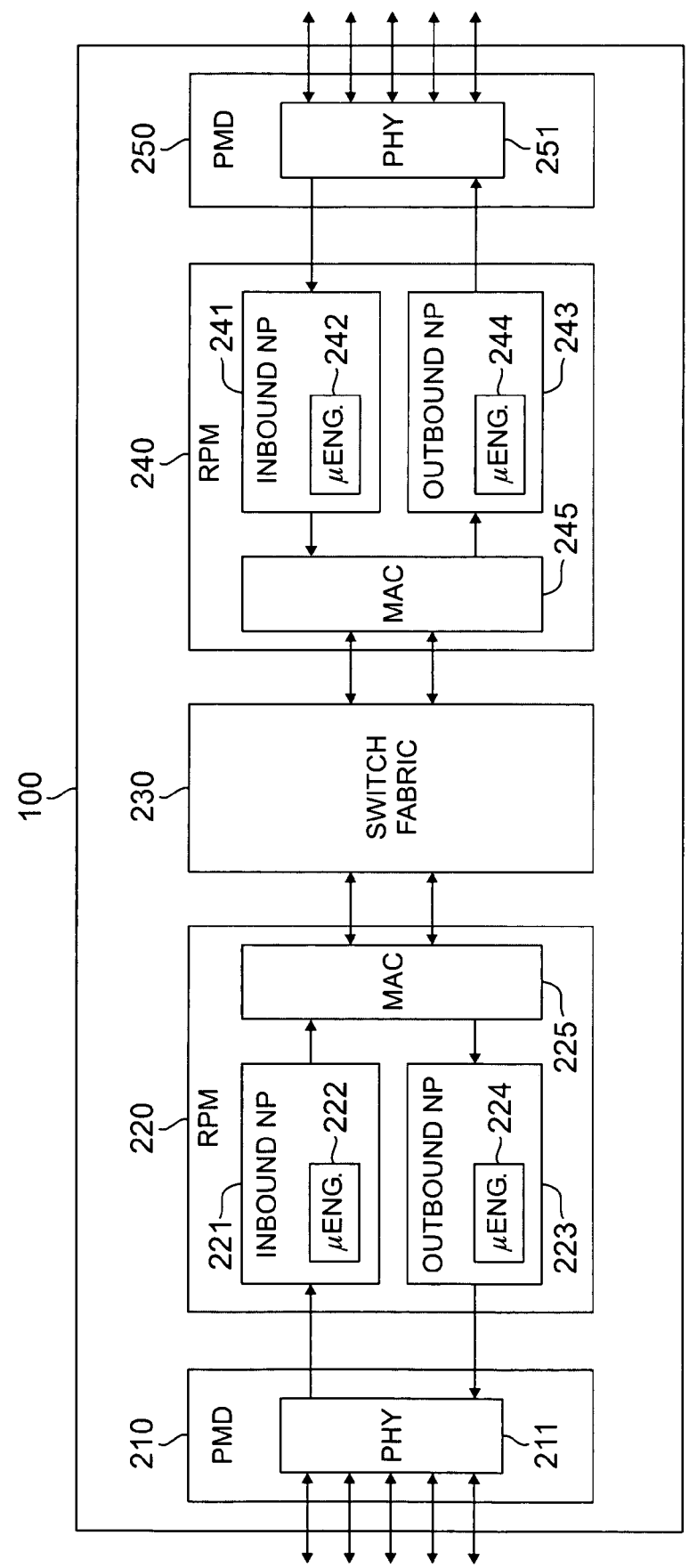
FIG. 2 illustrates selected portions of the exemplary router according to one embodiment of the present invention.

FIG. 2 illustrates selected portions of exemplary router 100 in greater detail according to one embodiment of the present invention. FIG. 2 simplifies the representation of some of the elements in FIG. 1. Router 100 comprises PMD modules 210 and 250, route processing modules 220 and 240, and switch fabric 230. PMD modules 210 and 250 are intended to represent any of PMD modules 111, 121, and 131 shown in FIG. 1. Route processing modules 220 and 240 are intended to represent any of RPM 112, RPM 122, and RPM 132 shown in FIG. 1. Switch fabric 230 is intended to represent crossbar switch 150 and the switch modules in shelves 110, 120 and 130 in FIG. 1.

PMD module 210 comprises physical (PHY) layer circuitry 211, which transmits and receives data packets via the external ports of router 100. PMD module 250 comprises physical (PHY) layer circuitry 251, which transmits and receives data packets via the external ports of router 100. RPM 220 comprises inbound network processor (NP) 221, outbound network processor (NP) 223, and medium access controller (MAC) layer circuitry 225. RPM 240 comprises inbound network processor (NP) 241, outbound network processor (NP) 243, and medium access controller (MAC) layer circuitry 245.

Each network processor comprises a plurality of microengines capable of executing threads (i.e., code) that forward data packets in router 100. Inbound NP 221 comprises N microengines (μEng.) 222 and outbound NP 223 comprises N microengines (μEng.) 224. Similarly, inbound NP 241 comprises N microengines (μEng.) 242 and outbound NP 243 comprises N microengines (μEng.) 244.

Two network processors are used in each route-processing module to achieve high-speed (i.e., 10 Gbps) bi-directional operations. Inbound network processors (e.g., NP 221, NP 241) operate on inbound data (i.e., data packets received from the network interfaces and destined for switch fabric 230). Outbound network processors (e.g., NP 223, NP 243) operate on outbound data (i.e., data packets received from switch fabric 230 and destined for network interfaces).

According to an exemplary embodiment of the present invention, each network processor comprises N=16 microengines that perform data plane operations, such as data packet forwarding. Each RPM also comprises a single RISC processor (not shown) that performs control plane operations, such as building forwarding (or look-up) tables. According to the exemplary embodiment, each microengine supports eight threads. At least one microengine is dedicated to reading inbound packets and at least one microengine is dedicated to writing outbound packets. The remaining microengines are used for forwarding table lookup.

In order to meet the throughput requirements for line rate forwarding at data rates up to 10 Gbps, it is necessary to split the data plane processing workload among multiple processors, microengines, and threads. The first partitioning splits the workload between two network processors—one operating on inbound data packets from the network interfaces to the switch and the other operating on outbound data packets from the switch to the network interfaces. Each of these processors uses identical copies of the forwarding table from its own memory space. This eliminates memory contention problems.

According to the principles of the present invention, the control and management plane functions (or operations) of router 100 may be distributed between inbound (IB) network processor 221 and outbound network processor 223. The architecture of router 100 allows distribution of the control and management plane functionality among many processors. This provides scalability of the control plane in order to handle higher control traffic loads than traditional routers having only a single control plane processor. Also, distribution of the control and management plane operations permits the use of multiple low-cost processors instead of a single expensive processor. For simplicity in terminology, control plane functions (or operations) and management plane functions (or operations) will hereafter be collectively referred to as control plane functions.

Figure 3:
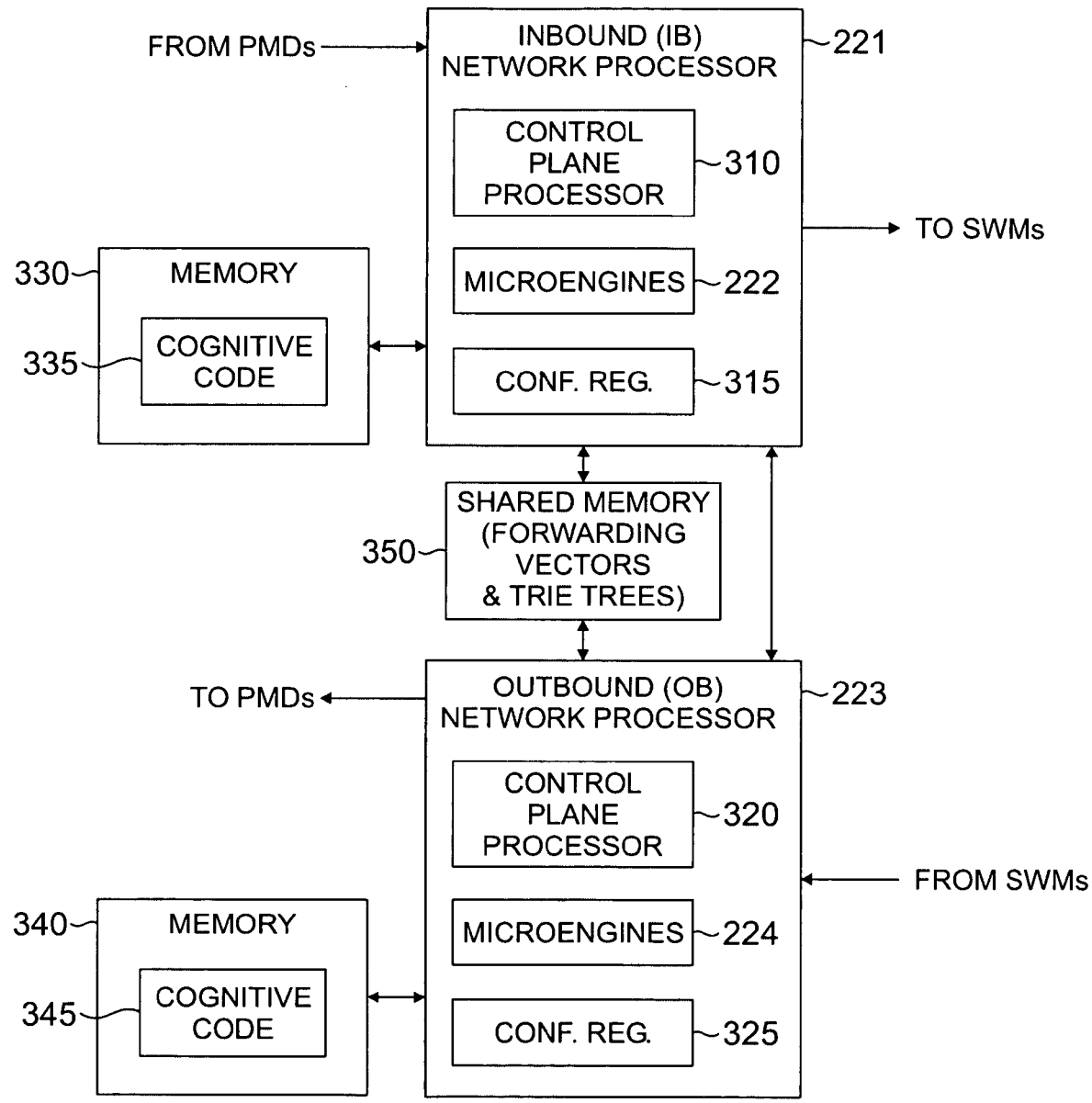
FIG. 3 illustrates the inbound network processor and outbound network processor according to an exemplary embodiment of the present invention.

FIG. 3 illustrates inbound network processor 221 and outbound network processor 223 according to an exemplary embodiment of the present invention. Inbound (IB) network processor 221 comprises control plane processor 310, microengine(s) 222, and configuration registers 315. Outbound (OB) network processor 223 comprises control plane processor 320, microengine(s) 224, and configuration registers 325. Inbound network processor 221 and outbound network processor 223 are coupled to shared memory 350, which stores forwarding table information, including forwarding vectors and trie tree search tables.

Control and management messages may flow between the control and data planes via interfaces between the control plane processors and data plane processors. For example, control plane processor 310 may send control and management messages to the microengines 222 and control plane processor 320 may send control and management messages to the microengines 224. The microengines can deliver these packets to the local network interfaces or to other RPMs for local consumption or transmission on its network interfaces. Also, microengines may detect and send control and management messages to their associated control plane processor for processing. For example, microengines 222 may send control and management plane messages to control plane processor 310 and microengines 224 may send control and management messages to control plane processor 320.

Inbound network processor 221 operates under the control of control software stored in memory 330, such as cognitive code 335. Similarly, outbound network processor 223 operates under the control of control software stored in memory 340, such as cognitive code 345. According to the principles of the present invention, cognitive code 335 and cognitive code 345 are identical software loads.

Network processors 221 and 223 in router 100 share routing information in the form of aggregated routes stored in shared memory 350. Network processors 221 and 223 are interconnected through Gigabit optical links to the switch modules (SWMs). Multiple SWMs can be interconnected through 10 Gbps links via Rack Extension Modules (REXMs). The management and routing functions/operations of router 100 are implemented in inbound network processor 221 and outbound network processor 223 in each RPM of router 100.

In order to meet the bi-directional 10 Gbps forwarding throughput of the RPMs, two network processors—one inbound and one outbound—are used in each RPM. Inbound network processor 221 handles inbound (IB) packets traveling from the external network interfaces to switch fabric 230. Outbound network processor 223 handles outbound (OB) packets traveling switch fabric 230 to the external network interfaces. In an exemplary embodiment of the present invention, control plane processor (CCP) 310 comprises an XScale core processor (XCP) and microengines 222 comprise sixteen microengines. Similarly, control plane processor (CCP) 320 comprises an XScale core processor (XCP) and microengines 224 comprise sixteen microengines.

The primary management and control plane functions of router 100 are management via Command Line Interface (CLI), management via Simple Network Management Protocol (SNMP), Standard Routing and Label Distribution Protocols, Internal Route Distribution using a proprietary protocol, and Forwarding Table Management (FTM). These functions can run in either inbound network processor 221 or outbound network processor 223, or in both.

According to the principles of the present invention, control functions/operations may be distributed between inbound network processor 221 and outbound network processor 223 because both processors execute identical cognitive code, namely cognitive code 335 and cognitive code 345. Each of inbound network processor 221 and outbound network processor 223 determines whether it is the inbound or outbound network processor by examining configuration register 315 and configuration register 325, respectively. Configuration files allow each processor to determine the functions (or operations) mapped to it and its role relative to those functions, typically a master role or a slave role. Thus, each one of inbound network processor 221 and outbound network processor 223 becomes cognitive of its position in the system and its role. Use of a single software load for both processors reduces the number of separate software loads that must be managed, thus reducing configuration management complexity.

Figure 4:
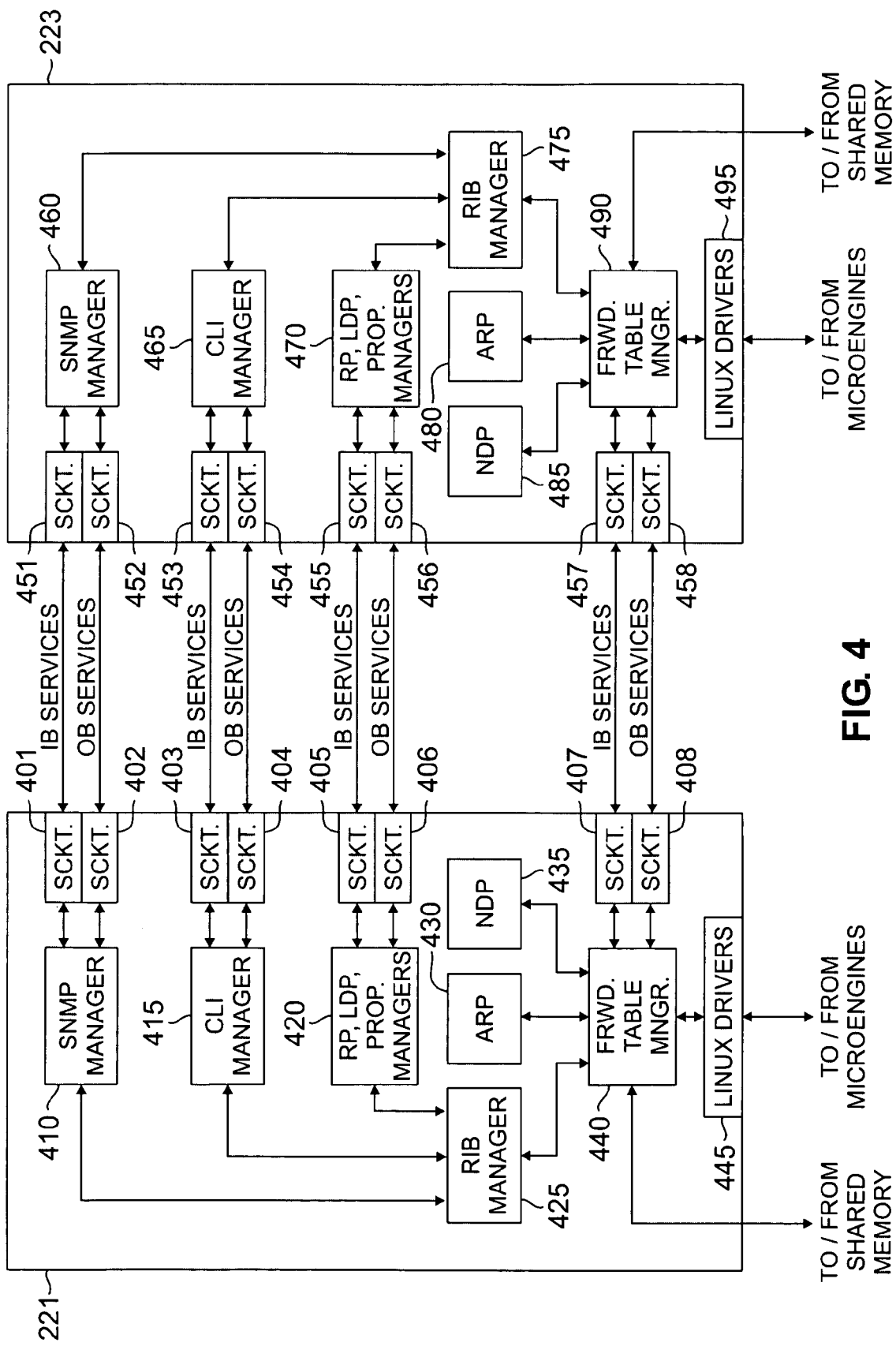
FIG. 4 illustrates the inbound network processor and outbound network processor in greater detail according to an exemplary embodiment of the present invention.

FIG. 4 illustrates inbound network processor 221 and outbound network processor 223 in greater detail according to an exemplary embodiment of the present invention. The primary management and control plane functions performed by control plane processors 310 and 320 are illustrated in FIG. 4, along with the interfaces between network processors 221 and 223 that facilitate the distribution of the functions.

As can be seen in FIG. 4, all of the major functions may be distributed across inbound network processor 221 and outbound network processor 223. In inbound network processor 221, the major functions comprise Simple Network Management Protocol (SNMP) manager 410, Command Line Interface (CLI) manager 415, standard Routing Protocols, Label Distribution Protocols, and Proprietary protocols manager 420, Routing Information Base (RIB) manager 425, Address Resolution Protocol (ARP) manager 430, Neighbor Discovery Protocol (NDP) manager 435, and Forwarding Table (FT) manager 440. In Outbound network processor 223, the major functions comprise Simple Network Management Protocol (SNMP) manager 460, Command Line Interface (CLI) manager 465, standard Routing Protocols, Label Distribution Protocols, and Proprietary protocols manager 470, Routing Information Base (RIB) manager 475, Address Resolution Protocol (ARP) manager 480, Neighbor Discovery Protocol (NDP) manager 485, and Forwarding Table (FT) manager 490. According to the exemplary embodiment, inbound network processor 221 and outbound network processor 223 communicate via sockets 401-408 and sockets 451-458.

According to an advantageous embodiment of the present invention, router 100 may use the control function partitioning shown in TABLE 1.

TABLE 1

| FUNCTION | MASTER | SLAVE |
| --- | --- | --- |
| SNMP | OB NP 223 | IB NP 221 |
| CLI | OB NP 223 | IB NP 221 |
| RP, LDF, prop. | IB NP 221 | OB NP 223 |
| FTM | IB NP 221 | OB NP 223 |

This configuration distributes the management functions to outbound network processor (OB NP) 223 and the routing protocol and forwarding table manager functions to inbound network processor (IB NP) 221. However, this partitioning of functionality can easily be changed by re-configuring configuration registers 315 and 325.

SNMP agent functions operate on OB NP 223, with processes in IB NP 221 providing SWM and Network Interface communication functions, as well as SMUX Peers or AgentX Servers to complete commands relating to the functionality of IB NP 221. VTYSH Subagent functions associated with CLI operate on OB NP 223, with IB NP 221 providing SWM and Network Interface communications functions, as well as VTYSH Servers to complete commands relating to the functions of IB NP 221. RP, LDP, and proprietary protocols operate on IB NP 221, with OB NP 223 providing Network Interface and SWM communications functions. Routes learned by OB NP 223 are sent to IB NP 221 for processing and FTM building. IB NP 221 builds the tables used by the microengines of both IB NP 221 and OB NP 223. OB NP 223 maintains Forwarding Descriptors in local memory, as commanded by IB NP 221.

In router 100, IB NP 221 receives data from the network interfaces and sends data to the switch modules, but cannot send data to the network interfaces and cannot receive data from the switch modules. OB NP 223 receives data from the switch module and sends data to the network interfaces, but cannot send data to the switch modules and cannot receive data from the network interfaces. Due to this asymmetrical communication scheme, inter-processor communications are required so that both processors may participate in all major control functions.

IB NP 221 and OB NP 223 communicate using standard Linux sockets 401-408 and 451-458. Standard IP protocols, such as User Datagram Protocol (UDP) or Transmission Control Protocol (TCP) are used on these communications links. Routing, label, forwarding, and management information are exchanged over these links.

TABLE 2 below lists the threads applicable to all distributed control functions. These threads run in both IB NP 221 and OB NP 223. The distribution of functions may be scaled to more than two network processors by including additional pairs of In and Out Services Sockets, along with associated threads and queues for each additional processor.

TABLE 2

| THREAD | FUNCTION |
| --- | --- |
| T-Main State Loop | Initialize and control all threads |
| T-Collector | Communicate with higher layer protocols |
| T-Reader | Read data from the other NP through the socket interface. There are copies of this for both Incoming and Outgoing Services |
| T-Writer | Write data to the other NP through the socket interface. There are copies of this thread for both the Incoming and the Outgoing Services. |

The main loop is a state machine (T-Main State Loop) that controls the other functional threads and the communication channels. The T-Collector thread receives data from higher level protocols through a pipe and delivers it to the functional module (e.g., FT manager 440, 490). The functional distribution model allows each network processor to request services from the other network processor. The local network processor receives requests for services from the remote network processor via the In Services Socket and sends requests for services to the remote NP via the Out Services Socket.

There are read (T-Reader) threads and write (T-Writer) threads associated with each of the sockets. In the case of Incoming Services, requests are received from the remote network processor via the associated T-Reader thread and responses to the requests are sent to the remote network processor via the T-Writer thread. The remote processor initiates transactions through the In Services Socket. In the case of Outgoing Services, requests are sent to the remote network processor via the associated T-Writer thread and responses to the requests are received from the remote network processor via the T-Reader thread. The local processor initiates transactions through the Out Services Socket.

This invention enables smaller, cheaper network processors to be used in parallel to achieve higher control plane throughput. The exemplary embodiment described herein uses two network processors, but could be expanded to more processors and does not require specialized network processors. This present invention may be used to provide high control plane processing power at a relatively low cost, thus allowing cheaper, higher performance routers to be built.

Although the present invention has been described with an exemplary embodiment, various changes and modifications may be suggested to one skilled in the art. It is intended that the present invention encompass such changes and modifications as fall within the scope of the appended claims.

What is claimed is:

1. A router for interconnecting external devices coupled to said router, said router comprising:

a switch fabric; and a plurality of routing nodes coupled to said switch fabric, wherein each of said plurality of routing nodes comprises: i) packet processing circuitry configured to exchange data packets with external devices and to exchange data packets with other ones of said plurality of routing nodes via said switch fabric and ii) control processing circuitry configured to perform control and management functions, wherein said control processing circuitry comprises:

a first network processor configured to perform a first group of control and management functions, wherein the control and management functions in the first group are determined based on contents of a first configuration register of the first network processor; and a second network processor configured to perform a second group of control and management functions, wherein the control and management functions in the second group are determined based on contents of a second configuration register of the second network processor, wherein said first network processor determines the first group of control and management functions allocated to said first network processor by examining the first configuration register, wherein said second network processor determines the second group of control and management functions allocated to said second network processor by examining the second configuration register, wherein a first one of said control and management functions may be re-allocated from said first group of control and management functions to said second group of control and management functions by modifying the contents of said first configuration register and said second configuration register, and wherein said first network processor is a master device with respect to said first group of control and management functions and said second network processor is a slave device with respect to said first group of control and management functions.

2. The router as set forth in claim 1 wherein said control and management functions are dynamically allocated between said first network processor and said second network processor according to a first level of activity of control and management functions in said first network processor relative to a second level of activity of control and management functions in said second network processor.

3. The router as set forth in claim 2 wherein said first network processor is controlled by first control software code and said second network processor is controlled by second control software code identical to said first control software code.

4. The router as set forth in claim 1 wherein said first network processor is a slave device with respect to said second group of control and management functions and said second network processor is a master device with respect to said second group of control and management functions.

5. The router as set forth in claim 4 wherein said first network processor processes data packets being transmitted from said external devices to said switch fabric.

6. The router as set forth in claim 5 wherein said second network processor processes data packets being transmitted from said switch fabric to said external devices.

7. A communication network comprising a plurality of routers that communicate data packets to one another and to interfacing external devices, each of said plurality of routers comprising:

a switch fabric; and a plurality of routing nodes coupled to said switch fabric, wherein each of said plurality of routing nodes comprises: i) packet processing circuitry configured to exchange data packets with external devices and to exchange data packets with other ones of said plurality of routing nodes via said switch fabric and ii) control processing circuitry configured to perform control and management functions, wherein said control processing circuitry comprises:

a first network processor configured to perform a first group of control and management functions, wherein the control and management functions in the first group are determined based on contents of a first configuration register of the first network processor; and a second network processor configured to perform a second group of control and management functions, wherein the control and management functions in the second group are determined based on contents of a second configuration register of the second network processor, wherein said first network processor determines the first group of control and management functions allocated to said first network processor by examining the first configuration register, wherein said second network processor determines the second group of control and management functions allocated to said second network processor by examining the second configuration register, wherein a first one of said control and management functions may be re-allocated from said first group of control and management functions to said second group of control and management functions by modifying the contents of said first configuration register and said second configuration register, and wherein said first network processor is a master device with respect to said first group of control and management functions and said second network processor is a slave device with respect to said first group of control and management functions.

8. The communication network as set forth in claim 7 wherein said control and management functions are dynamically allocated between said first network processor and said second network processor according to a first level of activity of control and management functions in said first network processor relative to a second level of activity of control and management functions in said second network processor.

9. The communication network as set forth in claim 8 wherein said first network processor is controlled by first control software code and said second network processor is controlled by second control software code identical to said first control software code.

10. The communication network as set forth in claim 7 wherein said first network processor is a slave device with respect to said second group of control and management functions and said second network processor is a master device with respect to said second group of control and management functions.

11. The communication network as set forth in claim 10 wherein said first network processor processes data packets being transmitted from said external devices to said switch fabric.

12. The communication network as set forth in claim 11 wherein said second network processor processes data packets being transmitted from said switch fabric to said external devices.

* * * * *